(12) United States Patent
Abdul Kalam et al.

(10) Patent No.: US 11,256,651 B2
(45) Date of Patent: Feb. 22, 2022

(54) MULTIPLE MASTER, MULTI-SLAVE SERIAL PERIPHERAL INTERFACE

(71) Applicant: QUALCOMM Incorporated, San Diego, CA (US)

(72) Inventors: Abdul Latheef Abdul Kalam, Cuddalore District (IN); Rekha L, Chittoor (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/837,325

(22) Filed: Apr. 1, 2020

(65) Prior Publication Data

US 2020/0341934 A1 Oct. 29, 2020

Related U.S. Application Data

(60) Provisional application No. 62/839,484, filed on Apr. 26, 2019.

(51) Int. Cl.
*G06F 13/42* (2006.01)
*G06F 13/40* (2006.01)
*G06F 9/46* (2006.01)
*G06F 13/16* (2006.01)

(52) U.S. Cl.
CPC ......... *G06F 13/4282* (2013.01); *G06F 9/466* (2013.01); *G06F 13/1673* (2013.01); *G06F 13/4031* (2013.01); *G06F 13/4068* (2013.01)

(58) Field of Classification Search
CPC .. G06F 13/4282; G06F 9/466; G06F 13/1673; G06F 13/4031; G06F 13/4068
See application file for complete search history.

(56) References Cited

U.S. PATENT DOCUMENTS

| | | | | |
|---|---|---|---|---|
| 7,002,926 | B1* | 2/2006 | Eneboe | H04L 49/254 370/255 |
| 7,526,587 | B2* | 4/2009 | Nemazie | G06F 13/4022 370/229 |
| 2006/0190649 | A1* | 8/2006 | Ganasan | G06F 13/4022 710/113 |
| 2010/0077127 | A1* | 3/2010 | Gupte | G06F 13/4022 710/317 |

(Continued)

*Primary Examiner* — Henry Tsai
*Assistant Examiner* — Harry Z Wang
(74) *Attorney, Agent, or Firm* — Qualcomm Incorporated

(57) ABSTRACT

Systems, methods, and apparatus provide a multi-master serial peripheral interface. An apparatus is coupled to master and slave devices through an interconnect circuit using individual point-to-point SPI links. The interconnect circuit may be configured to couple pairs of devices selected from the plurality of devices through their individual point-to-point SPI links, enable a first transaction to be completed between a first pair of devices after a first master device in the first pair of devices initiates the first transaction, enable a second transaction to be completed between a second pair of devices after a second master device in the second pair of devices initiates the second transaction, and prevent a collision between the first master device and the second master device while the first pair of devices are engaged in the first transaction. The pairs of devices may be selected when they are participants in one or more transactions.

14 Claims, 13 Drawing Sheets

(56) References Cited

U.S. PATENT DOCUMENTS

2015/0295858 A1* 10/2015 Chrysos .............. H04L 49/1523
370/412
2016/0140067 A1* 5/2016 Gately .................... G06F 13/28
710/110
2019/0171608 A1* 6/2019 Kunz .................... G06F 13/364

* cited by examiner

MULTIPLE MASTER, MULTI-SLAVE SERIAL PERIPHERAL INTERFACE

PRIORITY CLAIM

This application claims priority to and the benefit of U.S. Provisional Patent Application Ser. No. 62/839,484 filed in the U.S. Patent Office on Apr. 26, 2019, the entire content of this application being incorporated herein by reference as if fully set forth below in its entirety and for all applicable purposes.

TECHNICAL FIELD

The present disclosure relates generally to operation of a serial peripheral interface and, more particularly, to a serial peripheral interface that supports multiple master devices.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a serial bus. General-purpose serial interfaces are known in the industry, including the serial peripheral interface (SPI), which is commonly included in mobile communication devices to provide synchronous serial communication between a processor and various peripheral devices.

In one example, a SoC operates as an SPI master device coupled through the SPI bus to peripheral devices configured as slave SPI devices. The master device provides a clock signal on a clock line of the SPI bus, where the clock signal controls synchronous serial data exchanges between the master and slave devices. Data may be communicated using two or more data lines of the SPI bus. Since one or more of the data lines may be shared by multiple slave devices, the SPI bus provides a slave select line for each slave device to control access to shared data lines.

The protocols governing the operation of the conventional SPI bus that permit one SPI master to communicate with one or more SPI slave devices. As mobile communication devices continue to include a greater level of functionality, improved serial communication techniques are needed to support more complex architectures and device configurations.

SUMMARY

Certain aspects of the disclosure relate to systems, apparatus, methods and techniques that can provide a multi-master SPI bus in which two or more master devices can initiate transactions without causing collisions.

In various aspects of the disclosure, a method for managing a serial peripheral interface includes determining that a first master device has initiated a first transaction based on state of a first point-to-point SPI link coupled to the first master device, determining that a second master device has initiated a second transaction based on state of a second point-to-point SPI link coupled to the first master device, enabling the first transaction to be completed by connecting the first point-to-point SPI link to a third point-to-point SPI link coupled to a first slave device, and preventing a collision between the first master device and the second master device while the first transaction is being conducted. The first master device, the second master device and the first slave device may be operated in accordance with an SPI protocol that permits a single master coupled to an SPI bus.

In one example, the second master device initiates the second transaction after the first transaction is completed. In another example, first transaction and the second transaction are initiated concurrently, or the second transaction is initiated before the first transaction is completed. A first slave device may be involved in the first transaction and in the second transaction and the method may include storing data and chip select information associated with the first slave device in a buffer until the first transaction is completed, and completing the second transaction using the data and the chip select information stored in the buffer. The second transaction may be delayed until after the first transaction is completed. In another example, the first slave device is involved in the first transaction and a second slave device is involved in the second transaction. A first switched connection may be provided between the first point-to-point SPI link and the third point-to-point SPI link, and a second switched connection may be provided between the second point-to-point SPI link and a fourth point-to-point SPI link coupled to the second slave device. The first switched connection and the second switched connection may be separate and operated independently.

In one aspect, the method includes detecting initiation of the first transaction when the first master device asserts a slave select corresponding to the first slave device, and asserting a chip select of the first slave device when enabling completion of the first transaction.

In various aspects of the disclosure, an apparatus has a plurality of devices, each device including an SPI circuit, and an interconnect circuit coupled to each of the plurality of devices through point-to-point SPI links. The interconnect circuit may be configured to couple pairs of devices selected from the plurality of devices through their point-to-point SPI links, enable a first transaction to be completed between a first pair of devices after a first master device in the first pair of devices initiates the first transaction, enable a second transaction to be completed between a second pair of devices after a second master device in the second pair of devices initiates the second transaction, and prevent a collision between the first master device and the second master device while the first pair of devices are engaged in the first transaction. The pairs of devices may be selected when they are participants in one or more transactions.

In one aspect, the interconnect circuit is further configured to provide a point-to-point connection between the point-to-point SPI links of the first pair of devices, thereby enabling the first transaction to be completed.

In one aspect, the apparatus has a buffer configured to store data and chip select information associated with the first slave device until the first transaction is completed. The second transaction is completed using the data and the chip select information stored in the buffer. The interconnect circuit may delay the second transaction until after the first transaction is completed.

In one aspect, the apparatus has a switch configured to provide a first point-to-point switched connection between the point-to-point SPI links of the first pair of devices and concurrently provide a second point-to-point switched connection between the point-to-point SPI links of the second pair of devices. The first point-to-point switched connection and the second point-to-point switched connection are separate and may be operated independently.

In various aspects of the disclosure, an interconnect circuit adapted to support SPI bus operations has an arbiter configured to allow a first transaction selected from a plurality of transactions initiated by two or more master devices, one or more buffers configured to store chip select information and data associated with at least one transaction, and a switch configured to provide point-to-point connections, each point-to-point connection coupling a pair of devices that includes a master device and a slave device. The two or more master devices may be coupled to the interconnect circuit through corresponding point-to-point SPI links. Each of the plurality of transactions involves a slave device coupled to the interconnect circuit through a corresponding point-to-point SPI link. The arbiter and switch may cooperate to prevent a collision between the two or more master devices when the first transaction is being conducted.

In various aspects of the disclosure, a processor-readable storage medium is disclosed. The storage medium may be a non-transitory storage medium and may store code that, when executed by one or more processors, causes the one or more processors to determine that a first master device has initiated a first transaction based on state of a first point-to-point SPI link coupled to the first master device, determine that a second master device has initiated a second transaction based on state of a second point-to-point SPI link coupled to the first master device, enable the first transaction to be completed by connecting the first point-to-point SPI link to a third point-to-point SPI link coupled to a first slave device, and prevent a collision between the first master device and the second master device while the first transaction is being conducted. The first master device, the second master device and the first slave device may be operated in accordance with an SPI protocol that permits a single master coupled to an SPI bus.

DETAILED DESCRIPTION

Figure 1:
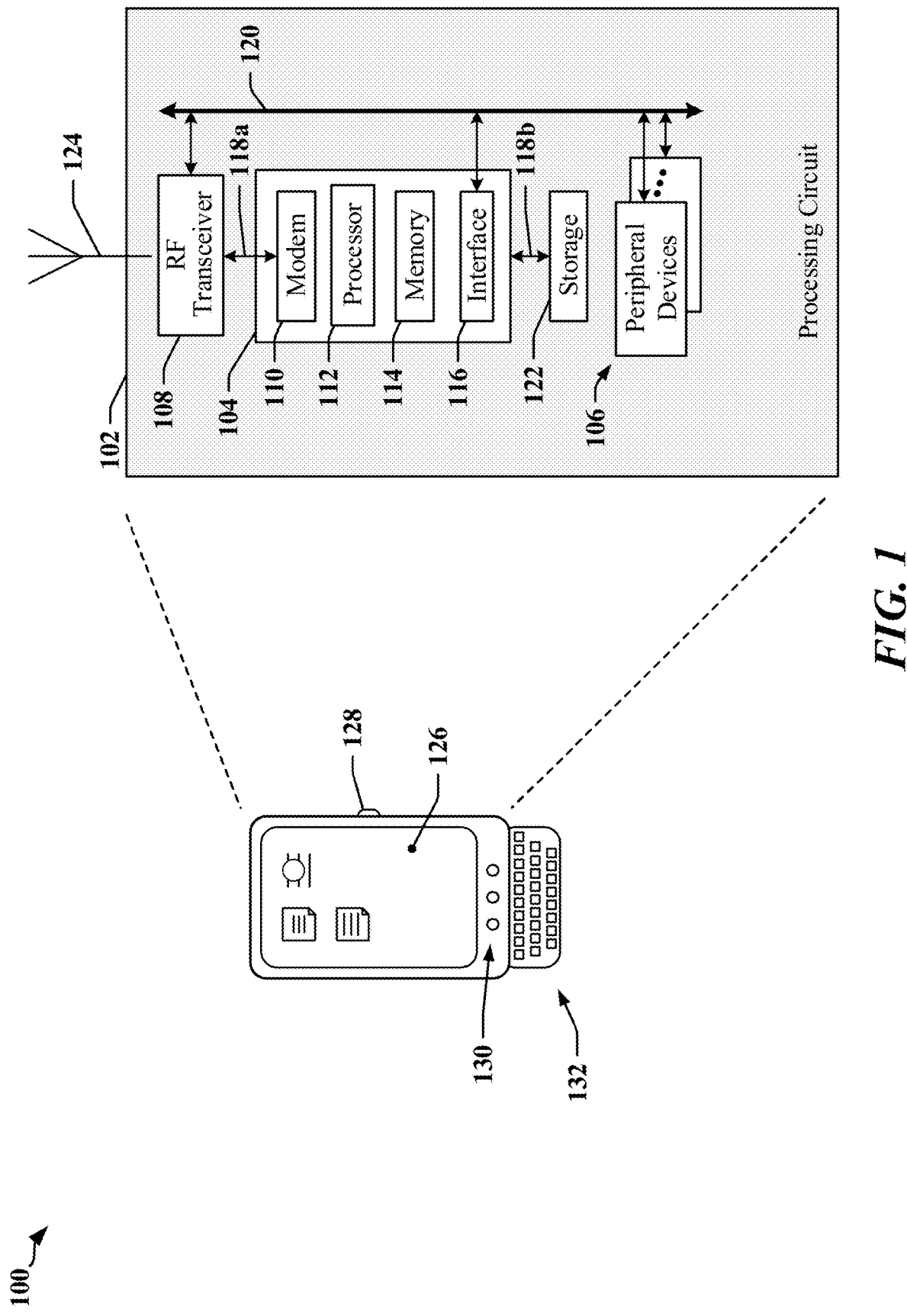
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect processors with modems and other peripherals. The devices may communicate in accordance with an SPI protocol adapted to permit multi-master operation. Each master device may select one of multiple slave devices using a slave select signal. Point-to-point communication is transacted between the master device and the selected slave device independently of other transactions that may be in progress.

In one example, an apparatus has a plurality of devices, each device including an SPI circuit, and an interconnect circuit coupled to each of the plurality of devices through point-to-point SPI links. The interconnect circuit may be configured to couple pairs of devices selected from the plurality of devices through their point-to-point SPI links, enable a first transaction to be completed between a first pair of devices after a first master device in the first pair of devices initiates the first transaction, enable a second transaction to be completed between a second pair of devices after a second master device in the second pair of devices initiates the second transaction, and prevent a collision between the first master device and the second master device while the first pair of devices are engaged in the first transaction. The pairs of devices may be selected when they are participants in one or more transactions.

Examples of Apparatus That Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108. At least some of the circuits or devices 104, 106 and/or 108 may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that provides an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114 and/or the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, which may be touch-sensitive and may accept user input, a keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with certain communication specifications or protocols. The processing circuit 102 may include or control a power management function that configures and manages the operation of the apparatus 100.

Figure 2:
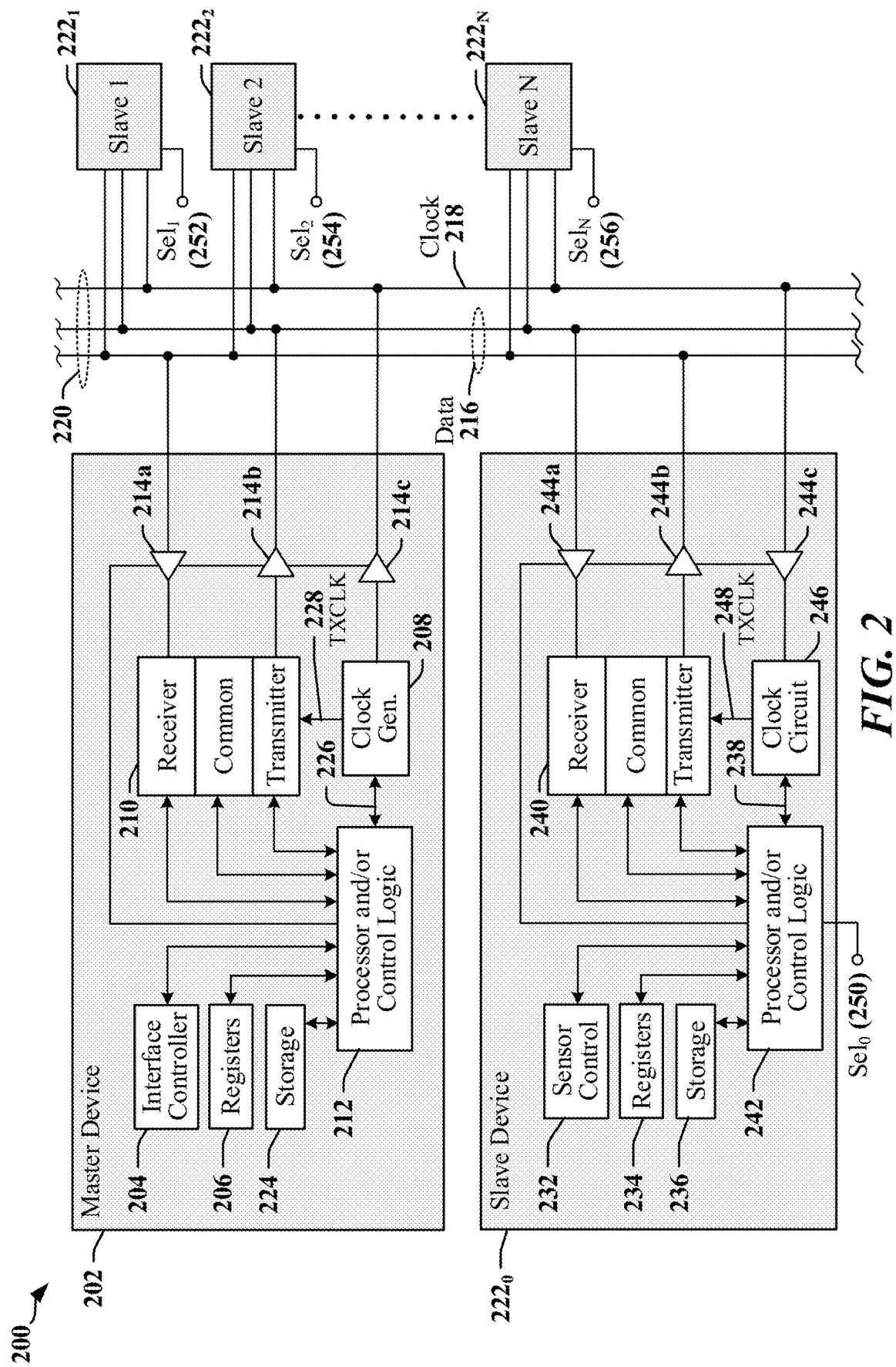
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220, where the serial bus is operated in accordance with an SPI protocol. The SPI protocols define an interface bus protocol that is commonly used to send data between microcontrollers and peripherals, including shift registers, sensors and Secure Digital (SD) cards and/or other components that provided on one or more devices 202 and $222_0$-$222_N$. The devices 202 and $222_0$-$222_N$ may be implemented in one or more semiconductor IC devices, such as an application processor, SoC or ASIC. In various implementations, the devices 202 and $222_0$-$222_N$ may include, support or operate as a modem, a signal processing device, a display driver, a camera, a user interface, a sensor, a sensor controller, a media player, a transceiver, radio frequency front end devices and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master device 202. Certain types of bus can support multiple bus master devices 202.

In one example, a bus master device 202 may include an interface controller 204 that manages access to the serial bus, configures slave devices $222_0$-$222_N$ and generates a clock signal 228 to be transmitted on a clock line 218 of the serial bus 220. The bus master device 202 may include configuration registers 206 or other storage 224, and other control logic 212 configured to handle protocols and/or higher-level functions. The control logic 212 may include a processing circuit such as a state machine, sequencer, signal processor or general-purpose processor. The bus master device 202 includes a transceiver 210 and line drivers/receivers 214a, 214b and 214c. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clock signals 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits or modules operable to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a, 244b and 244c. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data on one or more data lanes 216 based on timing in a clock signal 248 provided by clock generation and/or recovery circuits 246. The clock signal 248 may be derived from a signal received from the clock line 218. Other timing clock signals 238 may be used by the control logic 242 and other functions, circuits or modules.

In some implementations, the serial bus 220 is operated in accordance with an SPI protocol, although certain concepts may be applicable to other protocols. In one example, one device 202 may be configured to operate as a master device and multiple devices $222_0$-$222_N$ may be configured to operate as slave devices, with respect to the serial bus 220. The device 202 operating as a master device may select a slave device to participate in a transaction over the serial bus 220 using a corresponding slave select line 250, 252, 254, 256.

Examples of Serial Peripheral Interfaces

Figure 3:
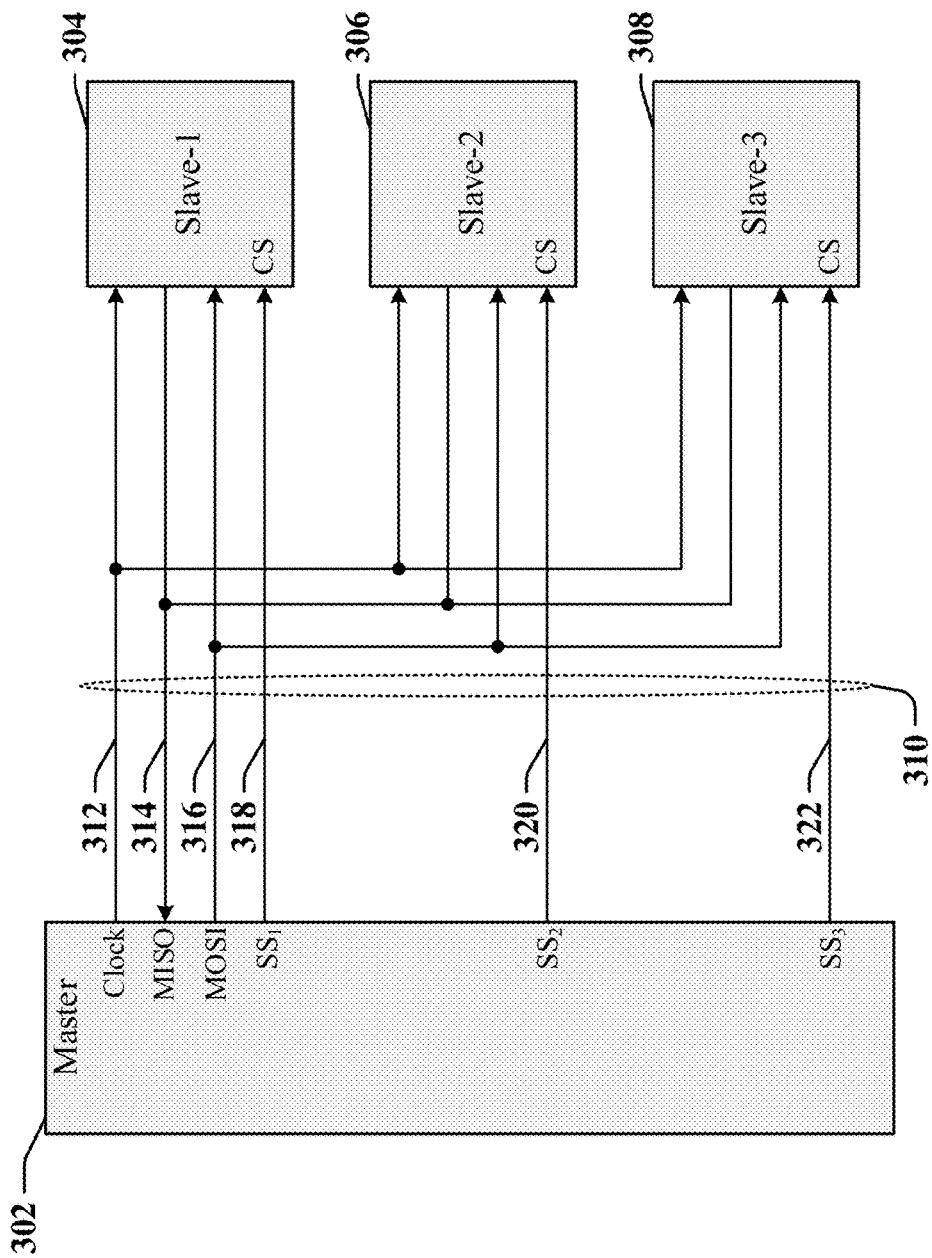
FIG. 3 illustrates certain aspects of a 2-dataline serial peripheral interface that may be adapted according to certain aspects disclosed herein.

In certain implementations, the SPI protocol provides a simple communication interface that has a clock wire, two data lines (Master In Slave Out (MISO) line, Master Out Slave In (MOSI) line) and a Chip Select (CS) for each slave device. The presence of MISO and MOSI lines enables full-duplex operation. FIG. 3 illustrates certain aspects related to the operation a two data line SPI 300. In some instances, a master device 302 may be incorporated in an SoC that serves as an application processor, host processor, or other functional component of an apparatus or system. The master device 302 is coupled to multiple slave devices 304, 306, 308 through a multi-wire bus 310. The master device 302 drives data to the slave devices 304, 306, 308 over a master-out-slave-in line (MOSI line 316) of the multi-wire bus 310. The slave devices 304, 306, 308 may each drive data to the master device 302 over a shared master-in-slave-out line (MISO line 314) of the multi-wire bus 310.

The multi-wire bus 310 includes at least one slave select line 318, 320, 322 for each slave device 304, 306, 308. As illustrated, a first slave select line 318 (SS1) controls bus access by the first slave device 304, a second slave select line 320 (SS2) controls bus access by the second slave device 306, and a third slave select line 322 (SS3) controls bus access by the third slave device 304. The master device 302 may assert a slave select line 318, 320, 322 to cause a corresponding slave device 304, 306, 308 to receive data over the MOSI line 316, and/or to grant permission to the corresponding slave device 304, 306, 308 to transmit on the MISO line 314.

In one example, the slave select lines 318, 320, 322 are not asserted when a low voltage level is applied to the slave select lines 318, 320, 322, and a slave select line 318, 320, 322 is asserted by driving the slave select line 318, 320, 322 to a high voltage level (e.g., towards the power supply level). In another example, the slave select lines 318, 320, 322 are not asserted when a high voltage level (e.g., the power supply level) is applied to the slave select lines 318, 320, 322, and a slave select line 318, 320, 322 is asserted by driving the slave select line 318, 320, 322 to a low voltage level. For each slave select line 318, 320, 322, a driver in the master device 302 may be operated to charge and discharge the slave select line 318, 320, 322 based on assertion state desired for the slave select line 318, 320, 322.

Data is transmitted between the master device 302 and a slave device 304, 306, 308 in accordance with a clock signal provided on a clock line 312 of the multi-wire bus 310. Data signaling is unidirectional on the MISO line 314 and on the MOSI line 316. Data is transferred over the MISO line 314 in a direction opposite to that of data transferred over the MOSI line 316. Data transfers over the MISO line 314 and MOSI line 316 are synchronized to the clock signal provided on the clock line 312.

Figure 4:
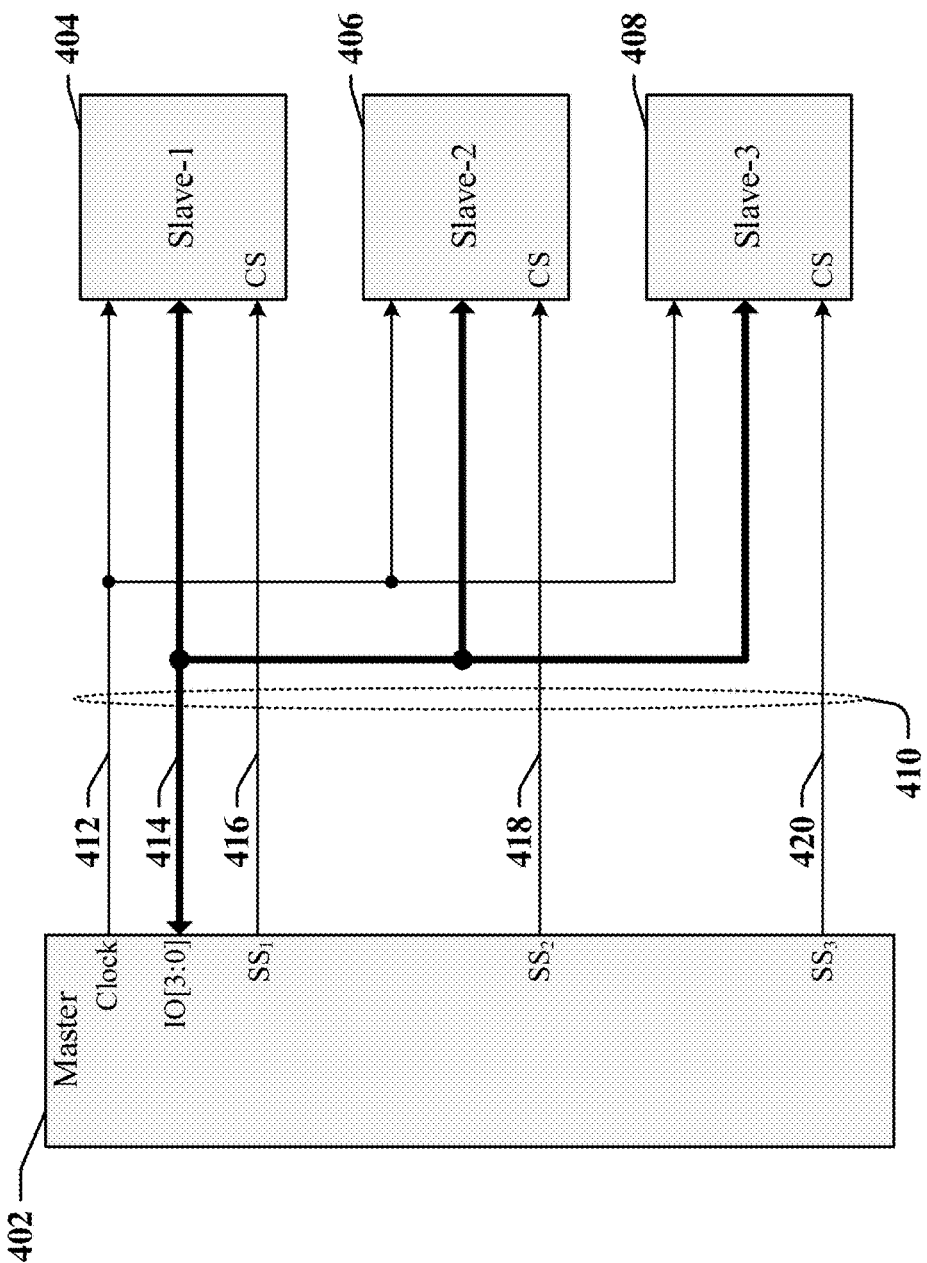
FIG. 4 illustrates certain aspects of a quad-serial peripheral interface that may be adapted according to certain aspects disclosed herein.

FIG. 4 illustrates certain aspects of a quad serial peripheral interface (QSPI) 400. A master device 402 may be incorporated in an SoC that serves as an application processor, host processor, or other functional component of an apparatus or system. The master device 402 is coupled to multiple slave devices 404, 406, 408 through a multi-wire bus 410. The master device 402 exchanges data with the slave devices 404, 406, 408 over a data channel 414 of the multi-wire bus 410, where the data channel 414 includes two data lines. The data channel 414 may be employed to provide greater data transfer rates than the two-wire unidirectional signaling scheme illustrated in FIG. 3.

The multi-wire bus 410 includes at least one slave select line for each slave device 404, 406, 408. As illustrated, a first slave select line 416 (SS1) controls bus access by the first slave device 404, a second slave select line 418 (SS2) controls bus access by the second slave device 406, and a third slave select line 420 (SS3) controls bus access by the third slave device 404. The master device 402 may assert a slave select line 416, 418, 420 to permit and/or cause a corresponding slave device 404, 406, 408 to transmit or receive data over the data channel 414.

In one example, the slave select lines 416, 418, 420 are not asserted when a low voltage level is applied to the slave select lines 416, 418, 420, and a slave select line 416, 418, 420 is asserted by driving the slave select line 416, 418, 420 to a high voltage level (e.g., towards the power supply level). In another example, the slave select lines 416, 418, 420 are not asserted when a high voltage level (e.g., the power supply level) is applied to the slave select lines 416, 418, 420, and a slave select line 416, 418, 420 is asserted by driving the slave select line 416, 418, 420 to a low voltage level. For each slave select line 416, 418, 420, a driver in the master device 402 may be operated to charge and discharge the slave select line 416, 418, 420 based on assertion state desired for the slave select line 416, 418, 420.

Data is transmitted between the master device 402 and a slave device 404, 406, 408 in accordance with a clock signal provided on a clock line 412 of the multi-wire bus 410. Data transfers on the data channel 414 are synchronized to the clock signal provided on the clock line 412.

In the two data line SPI 300 and the QSPI 400 illustrated in FIGS. 3 and 4 respectively, the master device 302, 402 asserts the chip select of a slave device 304, 306, 308 404, 406, 408 selected for participation in a transaction. The SPI implementations illustrated in FIGS. 3 and 4 support single-master, multiple-slave operation. Increasing numbers of systems require multiple-master, multiple-slave operation, which can be accomplished by adding additional chip selects, clock lines and data lines to each device to serve each of the multiple masters. In an example, where require N master-slave relationships exist, 4×N wires may be required to implement a two data line SPI between each master-slave pair. Each slave device must be equipped with 4 wires for each master device it serves, increasing cost and complexity of both the slave devices, and thereby defeating certain objectives of implementing the 4-wire multidrop architecture of the SPI.

Multiple-Master, Multiple-Slave SPI

According to certain aspects disclosed herein, an SPI bus may be adapted to support multiple-master, multiple-slave operation using slave devices in which a single instance of the SPI bus (e.g. 4 wires for the minimal full-duplex SPI bus) is implemented. In some implementations, each master device is provisioned with a number of slave-select pins sufficient to control the slave devices that are to communicate with the master device. In one aspect, the disclosed multi-master SPI implementations provide for a shared bus using a minimum number of wires.

Figure 5:
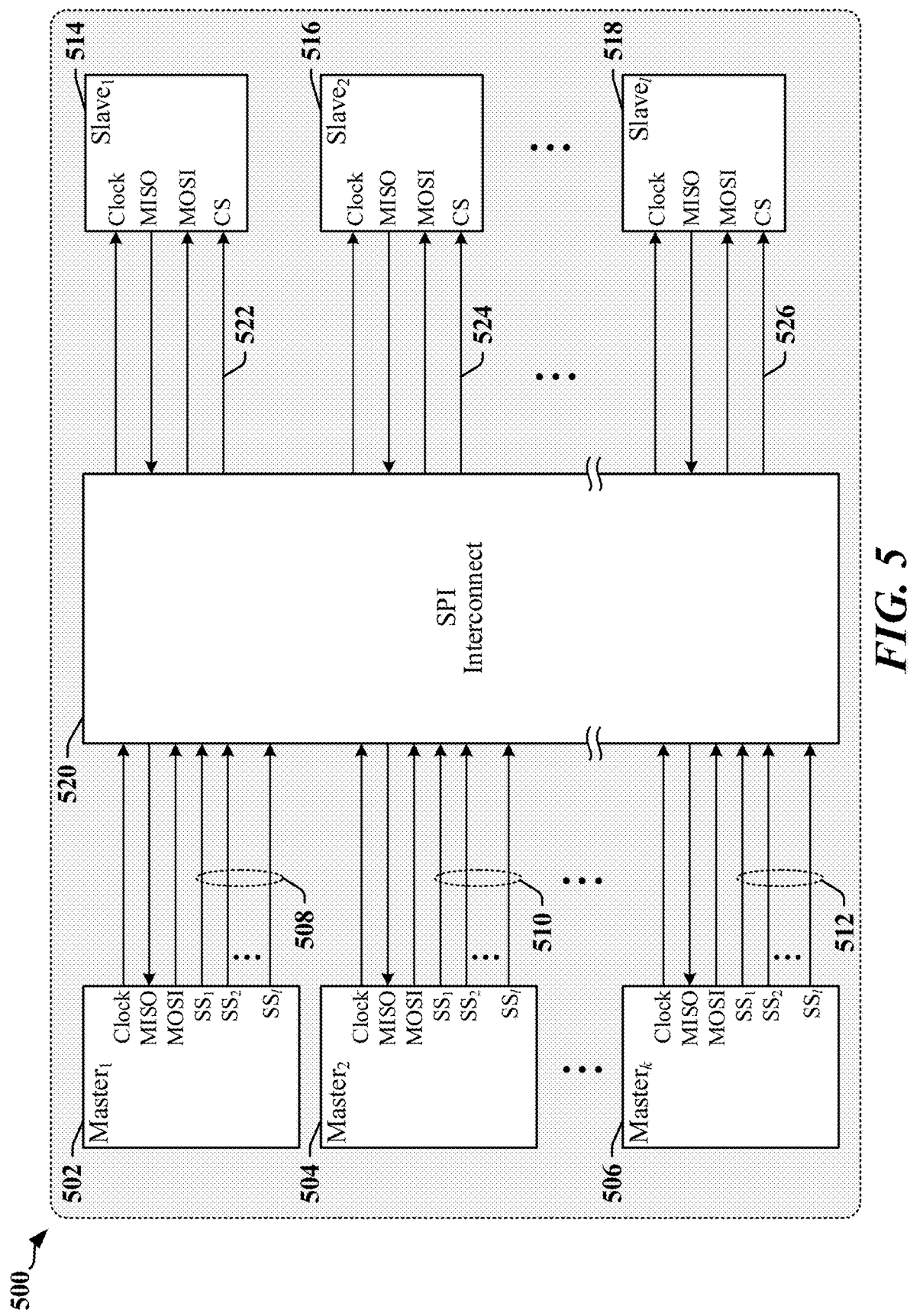
FIG. 5 illustrates a system that employs multi-master SPI to couple combinations of master devices and slave devices in accordance with certain aspects disclosed herein.

FIG. 5 illustrates a system 500 that can couple combinations of master devices 502, 504, 506 and slave devices 514, 516, 518 using a multi-master SPI provided in accordance with certain aspects disclosed herein. In the illustrated example, the system 500 includes an interconnect circuit 520 that receives slave select lines 508, 510, 512 from each of k master devices 502, 504, 506 and drives the chip-select lines 522, 524, 526 of l slave devices 514, 516, 518. The interconnect circuit 520 may be configured to couple a master device 502, 504, 506 with a slave device 514, 516, 518 for each transaction, and to resolve conflicts that can arise when two or more master devices 502, 504, 506 attempt to access one slave device 514, 516, 518 concurrently.

The interconnect circuit 520 may be configured to facilitate different types or modes of multi-master communication that may occur by chance or by design. A first multi-master communication mode is employed when one master device 502, 504, 506 is communicating with one slave device 514, 516, 518. The first mode may become operational in low-traffic scenarios when there is no contention between master devices 502, 504, 506 for the SPI bus. In some instances, the first mode may be employed when system design precludes more than one master device 502, 504, 506 being active on the SPI bus at any given time. In some instances, the first mode may be employed when collision detection logic or protocols are implemented in the master devices 502, 504, 506 to prevent more than one master device 502, 504, 506 from being active on the SPI bus at any given time.

Figure 6:
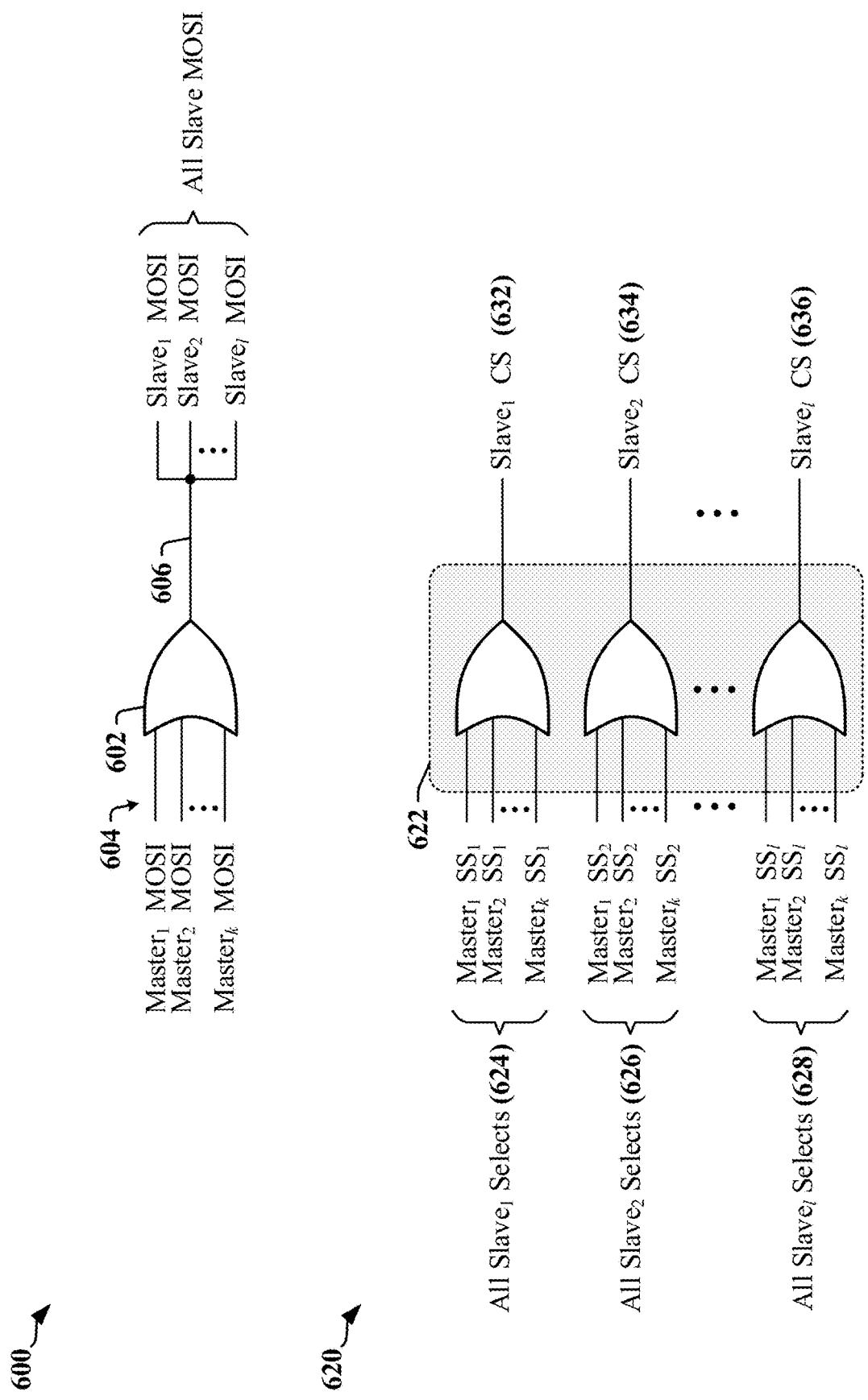
FIG. 6 illustrates logic circuits that may be included in an interconnect circuit that can implement a first multi-master communication mode in accordance with certain aspects disclosed herein.

FIG. 6 illustrates logic circuits 600, 620 that may be included in an interconnect circuit 520 that can implement the first multi-master communication mode. A first logic circuit 600 includes logic 602 that implements a logic-OR function to combine the MOSI outputs 604 provided by all of the master devices 502, 504, 506. In this example, idle master devices 502, 504 and/or 506 keep their respective MOSI outputs 604 in a low logic state and the output 606 the logic 602 follows the MOSI output of the active master device 502, 504 or 506. The output 606 the logic 602 drives the MOSI pin of each of the slave device 514, 516, 518.

A second logic circuit 620 includes logic 622 that implements one or more logic-OR combinations on corresponding slave selects 624, 626, 628 of each master device to obtain a chip-select 632, 634, 636 for each of the slave devices 514, 516, 518. As illustrated, the chip-select 632 of a first slave device 514 is generated as an OR combination of the $SS_1$ contributed by each of the k master devices 502, 504, 506, the chip-select 634 of a second slave device 516 is generated as an OR combination of the $SS_2$ contributed by each of the k master devices 502, 504, 506 and so on up to the chip-select 636 of an $l^{th}$ slave device 518, which is generated as an OR combination of the SS/contributed by each of the k master devices 502, 504, 506. In some instances, one or more master devices 502, 504, 506 contribute less than l slave select outputs, and missing slave select signals may be ignored or represented as a fixed logic-0 input to the logic 622. In some instances, the slave select outputs of one master device 502, 504 or 506 may be mapped differently than the slave select outputs of other master devices 502, 504 and/or 506, such that some combination of connectors and mapping logic (not shown) may be used to align slave select signals with a chip-select signal for the corresponding slave device 514, 516, 518. In the illustrated example, idle master devices 502, 504 and/or 506 keep their respective slave select outputs low and the chip-selects 632, 634, 636 output by the logic 622 follows the slave select output of the active master device 502, 504 or 506.

In the first multi-master communication mode, the MISO input of the master devices 502, 504 or 506 can be coupled to the MISO outputs of each slave device 514, 516, 518 and the MISO line is operated in accordance with conventional SPI protocols.

The first multi-master communication mode typically cannot accommodate operations where multiple master devices 502, 504 or 506 attempt to be active on the SPI bus at the same time.

Figure 7:
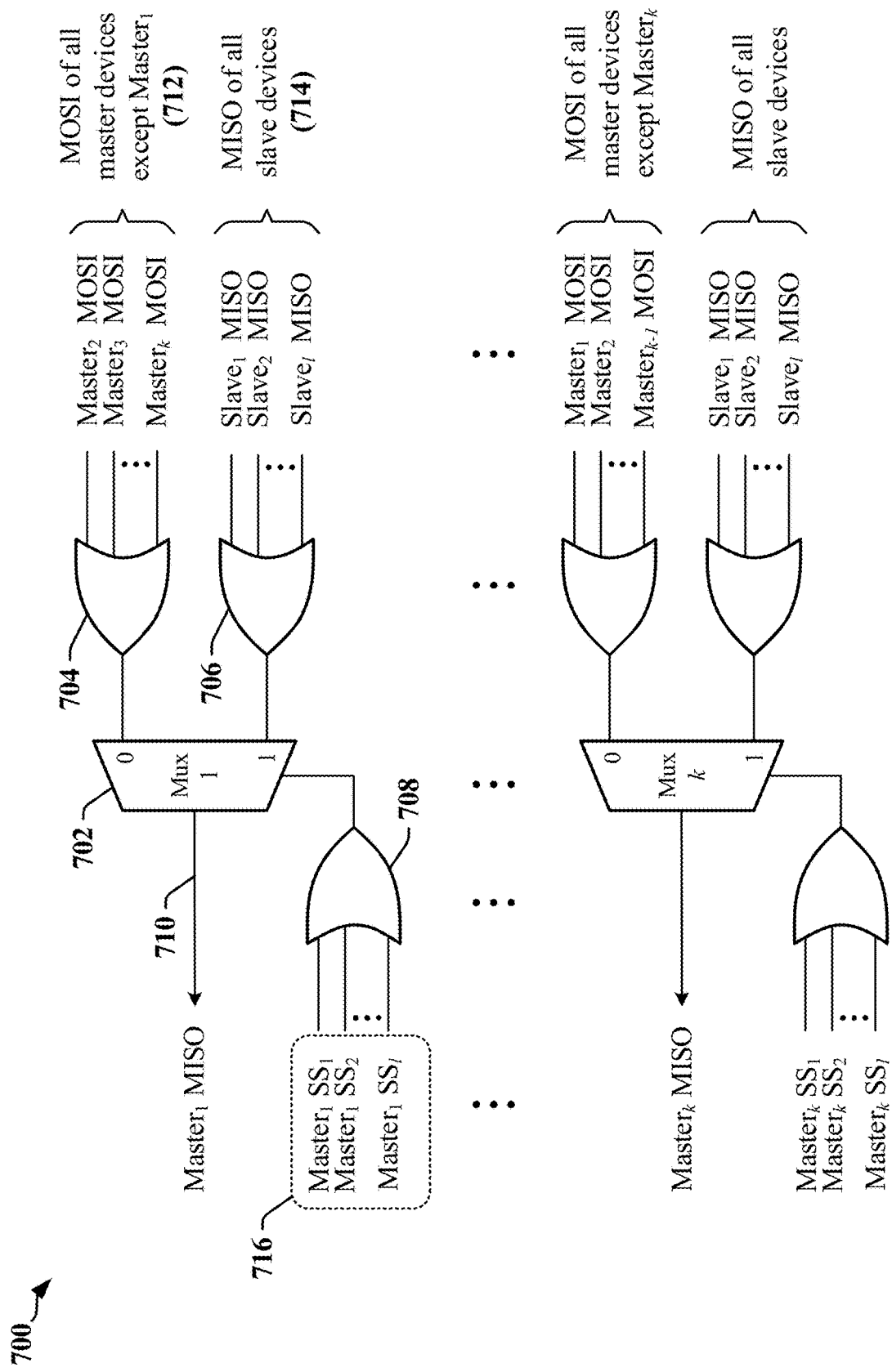
FIG. 7 illustrates a logic circuit that may be included in an interconnect circuit that can implement a second multi-master communication mode in accordance with certain aspects disclosed herein.

FIG. 7 illustrates a logic circuit 700 that may be included in an interconnect circuit 520 that can implement a second multi-master communication mode provided in accordance with certain aspects of this disclosure. The second multi-master communication mode may accommodate master devices 502, 504 or 506 that can attempt to take active control of the SPI bus when another master device 502, 504 or 506 is active. In the second multi-master communication mode, a collision avoidance scheme may be implemented. A collision may occur when signals are transmitted concurrently on one or more wires of the SPI bus, causing interference and loss of signaling integrity. For example, two or more master devices 502, 504 or 506 may simultaneously attempt to communicate with the same slave device 514, 516, 518, thereby causing a collision. Collision avoidance may be accomplished when a first master device 502, 504 or 506 can determine whether another master device 502, 504 or 506 is communicating when the first master device 502, 504 or 506 is initiating data transfer. Each master device 502, 504 or 506 may be configured to detect communication involving another master device 502, 504 or 506 by monitoring the MOSI pins of the other master devices 502, 504 or 506. In the example illustrated in FIG. 7, a master device 502, 504 or 506 that wishes to initiate communication may monitor the MOSI pins of the other master devices 502, 504 and/or 506 through feedback provide at the MISO input.

In the illustrated example, a circuit provided for each of the k master devices 502, 504 or 506 includes a multiplexer that can provide feedback to the MISO input of the corresponding master device 502, 504 or 506. In the example of the first master device 502, the output 710 of the corresponding multiplexer 702 represents the signaling states of the MISO lines 714 of all slave device 514, 516, 518, combined by MISO logic 706, when the first master device 502 has asserted any slave select signal 716. The output of the SS combinational logic 708 is active when any of the slave select signals of the first master device 502 is active, and inactive when the first master device 502 has not asserted any slave select signal 716. Normal communication between the first master device 502 and one of the slave devices 514, 516, 518 is enabled when the output of the SS combinational logic 708 is active. When the first master device 502 is not communicating, or attempting to communicate with a slave device, the output of the SS combinational logic 708 is inactive and the MISO input of the first master device 502 receives a signal output by MOSI combinational logic 704 representing the combined signaling state of the MOSI outputs 712 of all other master devices 504 and 506. The first master device 502 can determine bus activity by monitoring its MISO input before initiating a transaction on the SPI bus.

Figure 8:
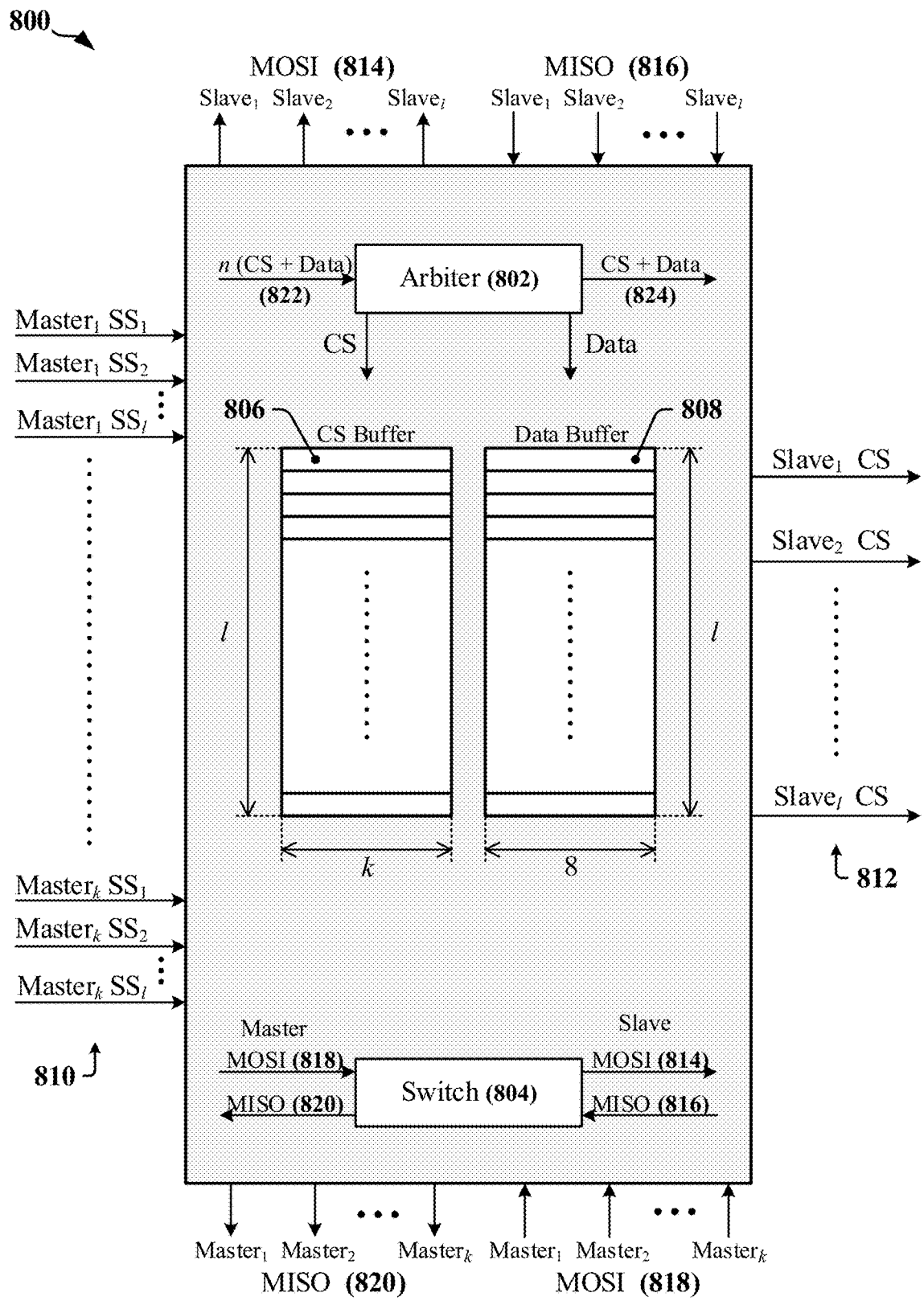
FIG. 8 illustrates an interconnect circuit that can implement a third multi-master communication mode in accordance with certain aspects disclosed herein.

FIG. 8 illustrates an interconnect circuit 800 that can implement a third multi-master communication mode, which may accommodate concurrent use of the SPI bus by multiple master devices 502, 504 and/or 506. In the second multi-master communication mode, a combination of arbitration and switching may be configured according to the type of concurrent communication attempted. Arbitration may be activated when two or more master devices 502, 504 and/or 506 are contending for access to the same slave device 514, 516, 518. Switching may be activated when two or more master devices 502, 504 and/or 506 attempt to access different slave devices 514, 516, 518.

The interconnect circuit 800 may be configured to drive the MOSI signals 814 provided to multiple slave devices 514, 516, 518 and to receive the MISO signals 816 transmitted by the slave devices 514, 516, 518. The interconnect circuit 800 may be further configured to drive the chip select signals 812 provided to the slave devices 514, 516, 518. The interconnect circuit 800 may be configured to receive MOSI signals 818 transmitted by master devices 502, 504, 506 and to drive the MISO signals 820 provided to inputs of the master devices 502, 504, 506. The interconnect circuit 800 may be further configured to receive the slave select signals 810 output by the master devices 502, 504, 506. The various signals 810, 816, 818 received by the interconnect circuit 800 are routed and/or buffered for driving certain signals 812, 814, 820 provided to inputs of the master devices 502, 504, 506 and/or the slave devices 514, 516, 518.

The interconnect circuit 800 may include an arbiter 802 that can be configured to detect impending collisions and to arbitrate, prioritize, schedule and manage transactions that are concurrently requested or initiated by two or more master devices 502, 504, 506 when concurrently requested or initiated transactions are directed to the same slave device 514, 516, 518. The arbiter 802 may monitor the slave select signals 810 output by the master devices 502, 504, 506 and may arbitrate between two or more master devices 502, 504, 506 that have asserted slave select signals 810 directed to the same slave device 514, 516, 518. The arbiter 802 may prioritize any number (n) of slave select and data combinations 822 and may initiate and/or manage a transaction involving one of the combinations 824. The transaction may be initiated when the interconnect circuit 800 drives a chip select signal 812 to one of the slave devices 514, 516, 518. The interconnect circuit 800 may then permit or enable the selected master device 502, 504, 506 to complete the transaction. Combinations 824 that were not selected for immediate initialization may be buffered in a chip select buffer 806 and a data buffer 808. The chip select buffer 806 may have sufficient width to store the chip select value for every slave device 514, 516, 518, and may have a depth (l) sufficient to buffer a transaction for each master device 502, 504, 506. The data buffer 808 may have sufficient width to store one or more bytes or words per transaction and a depth matching the depth of the chip select buffer 806 (e.g., sufficient to buffer a transaction for each master device 502, 504, 506). In some instances, all transactions may be buffered pending arbitration. In some instances, transactions are buffered when a potential conflict is detected.

The arbiter 802 may be configured to implement a queueing or scheduling algorithm, such as a round-robin algorithm, a random early detection algorithm, or another type of algorithm. The scheduling algorithm may be selected based on design specifications and/or during configuration.

The interconnect circuit 800 may include a switching circuit 804 that can independently connect two or more master devices 502, 504, 506 to different slave devices 514, 516, 518 such that multiple transactions can be conducted concurrently. When one or more transactions are being executed through the interconnect circuit 800, the interconnect circuit 800 can selectively couple MOSI signals 814, which are provided to the slave devices 514, 516, 518, to MOSI signals 818 transmitted by corresponding master devices 502, 504, 506 and can selectively provide the MISO signals 820, which are provided to the inputs of the master devices 502, 504, 506, to the MISO signals 816 transmitted by corresponding slave devices 514, 516, 518. The switching circuit 804 may provide such coupling between master-slave pairings when no conflict is detected. For example, the switching circuit 804 may couple a master device 502, 504, 506 with a slave device 514, 516, 518 when neither device is in active communication and/or when access to the slave device 514, 516, 518 is not concurrently requested by another master device 502, 504, 506. When the switching circuit 804 determines a conflict that prevents coupling of a master device 502, 504, 506 with a slave device 514, 516, 518, the conflicted transaction may be handled by the arbiter 802.

Figure 9:
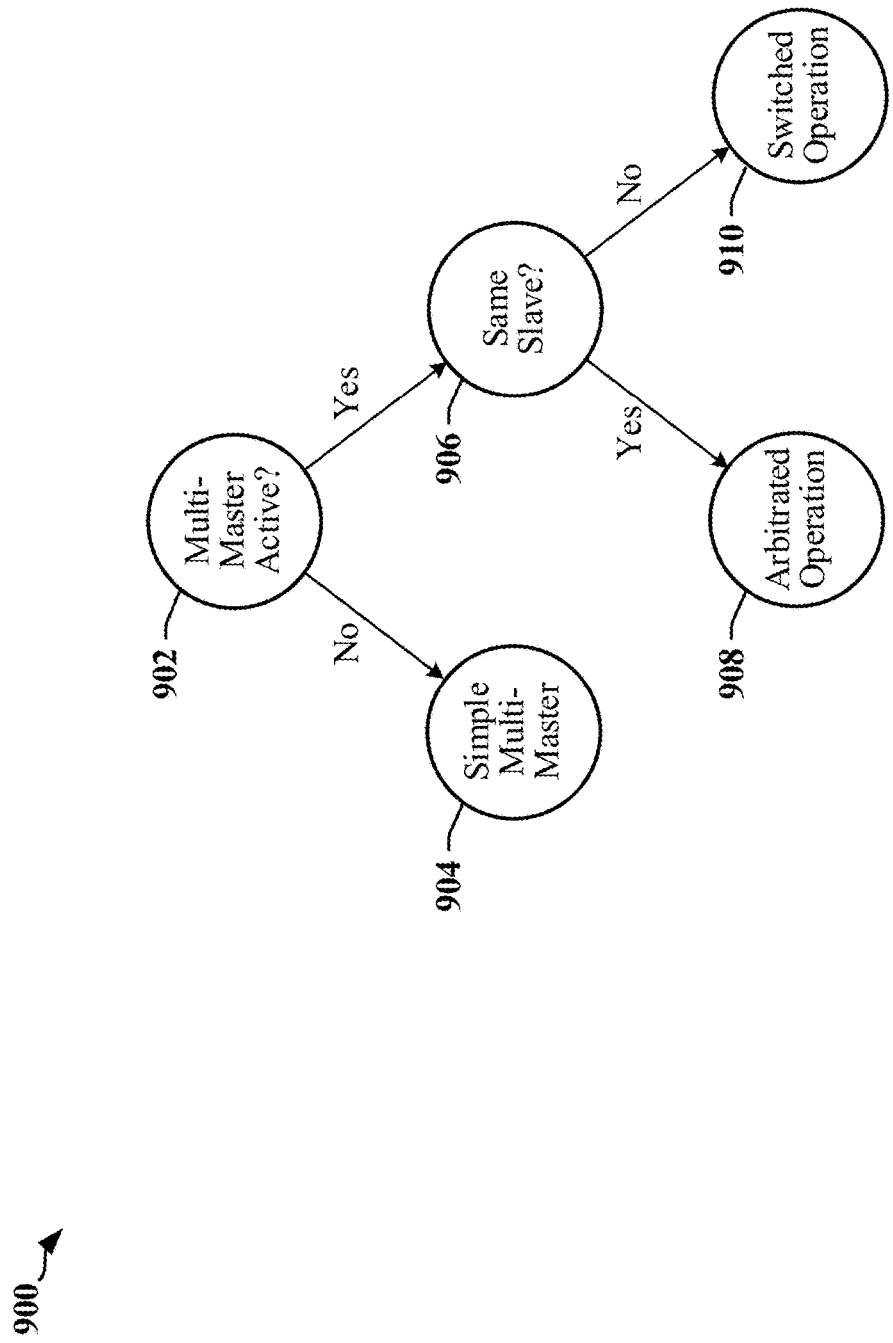
FIG. 9 is a state diagram illustrating certain aspects of the operation of the interconnect circuit of FIG. 8.

FIG. 9 is a partial state diagram 900 illustrating certain aspects of the operation of the interconnect circuit 800. The partial state diagram 900 may represent the operation of a state machine or processor that selects and/or controls certain multi-master communication modes. The state machine may enter an initial state 902 when one of the slave devices select signals 810 is asserted by a master device 502, 504, 506. The state machine may determine whether multi-master modes are active or available. If no multi-master mode is activated, then the state machine may enter a simple multi-master state 904 from which the pending transaction is conducted. In one example, the transaction may be conducted in accordance with the first multi-master communication mode illustrated in FIG. 6 in the single-master state 904.

When multi-master mode is activated, the state-machine may enter a multi-master state 906 from the initial state 902. In the multi-master state 906, the interconnect circuit 800 may determine the form or nature of the requested or initiated multi-master operation. When two or more master devices 502, 504, 506 are initiating transactions with the same slave device 514, 516, 518, the state machine may enter an arbitrated state 908 and manage the transactions using the arbiter 802. When two or more master devices 502, 504, 506 are initiating transactions with different slave devices 514, 516, 518, the state machine may enter a switched state 910 and manage the transactions using the switching circuit 804.

Figure 10:
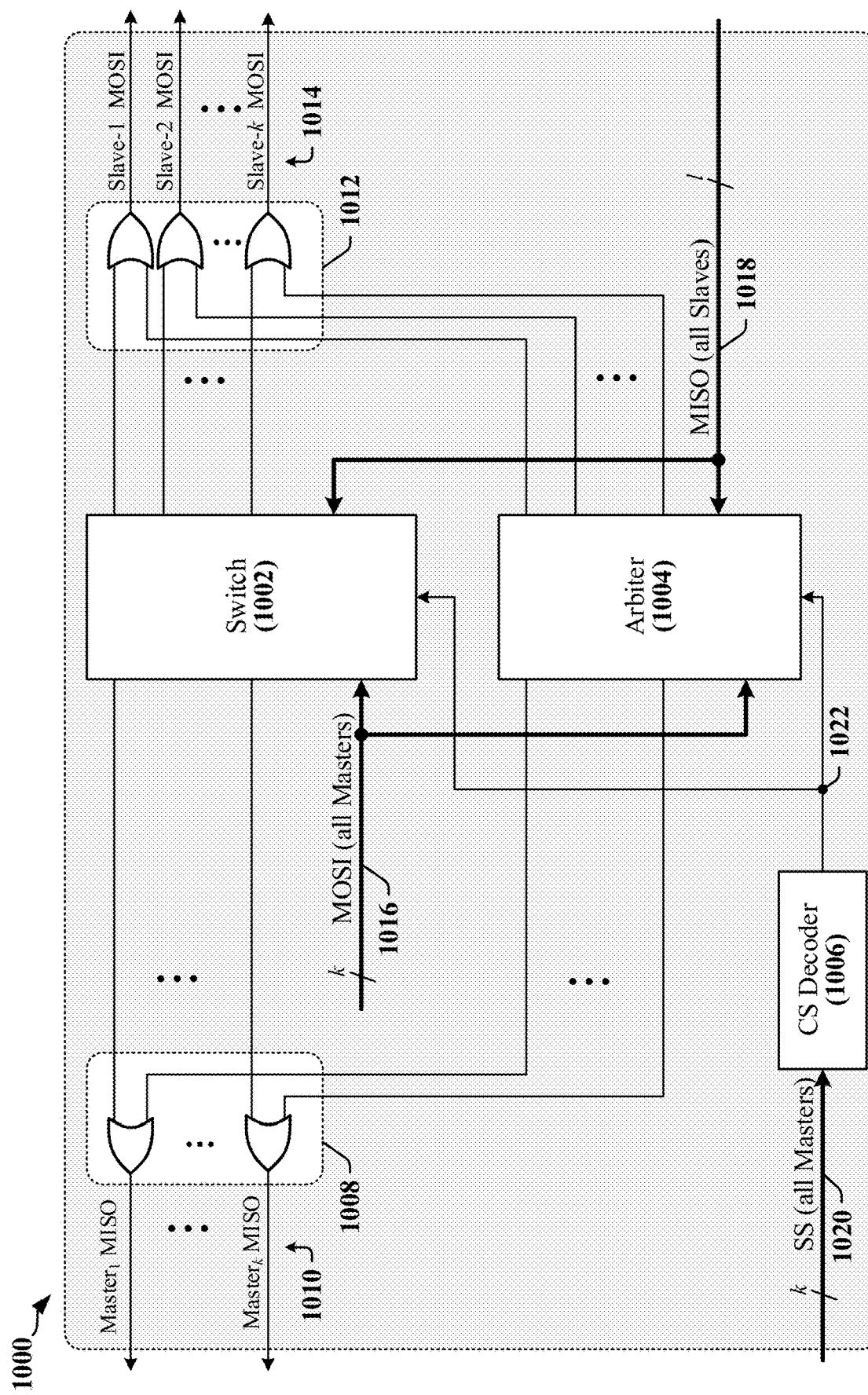
FIG. 10 illustrates certain circuits that illustrate some further aspects of the operation of the interconnect circuit of FIG. 8.

FIG. 10 illustrates certain circuits 1000 that illustrate some aspects of the operation of the interconnect circuit 800. A switching circuit 1002 and an arbiter 1004 receive the MOSI outputs 1016 provided by the master devices 502, 504, 506. The switching circuit 1002 and an arbiter 1004 also receive the MISO outputs 1018 provided by the slave devices 514, 516, 518. MISO signals 1010 are provided to the master devices 502, 504, 506, and these MISO signals 1010 are obtained by combining corresponding MISO outputs of the switching circuit 1002 and arbiter 1004 using combinational logic 1008. MOSI signals 1014 provided to the slave devices 514, 516, 518 are obtained by combining corresponding MOSI outputs of the switching circuit 1002 and arbiter 1004 using combinational logic 1012. The switching circuit 1002 and arbiter 1004 receive chip select information 1022 that is used to select between the MISO outputs and between the MOSI outputs of the switching circuit 1002 and arbiter 1004. The chip select information 1022 is generated by a chip select decoder 1006 that receives and processes the slave select outputs 1020 of all master devices 502, 504, 506. The chip select decoder 1006 can determine whether two or more master devices 502, 504, 506 are initiating a transaction and whether the two or more master devices 502, 504, 506 are initiating their respective transactions with the same slave device 514, 516, 518.

The chip select decoder 1006 may include or cooperate with a scheduler that can arbitrate and prioritize transactions initiated concurrently by multiple master devices 502, 504, 506. In one example, multiple master devices 502, 504, 506 may simultaneously or concurrently attempt to access an SPI bus. When multiple concurrent accesses target the same slave device 514, 516, 518, a master device 502, 504, 506 can be selected to proceed with the transaction using any priority algorithm (e.g., preferred round robin) and the selected master device 502, 504, 506 may be allowed or enabled to access the selected slave device 514, 516, 518. The data associated with transactions initiated by other master devices 502, 504, 506 can be buffered for executing a future (delayed) transaction.

Certain operations related to the interconnect circuit 800 of FIG. 8 may be appreciated from consideration of an example in which three master devices 502, 504, 506 and three slave devices 514, 516, 518 are coupled to an SPI bus. For the purposes of this example, the master devices may be represented as M1, M2 and M3 and the slave devices may be represented as S1, S2 and S3. Arbitration may be implemented using a round robin algorithm. If M1 and M2 attempt to communicate at the same time with S1, then the round robin algorithm may select either M1 or M2 to proceed with a transaction. The slave select signals provided by M1, M2 and M3 corresponding to the chip select input of S1 may be represented as CSM1, CSM2 and CSM3, respectively. When M1 is selected, the enabled transaction involves M1 and S1. Data to be sent by M2 to S1 can be buffered in the data buffer 808 of the interconnect circuit 800. When the transaction between M1 and S1 is completed, then the transaction between M2 and S1 can be initiated.

In a first example, CSM1 is initially active indicating that Master M1 is active. The arbiter 802 may check CSM2 and CSM3 to determine if a potential for collision with other master devices exists. The operation of certain circuits and/or processes in the interconnect circuit 800 may be expressed as follows:

If ((CSM1!=CSM2) && (CSM1!=CSM3))
        Allow M1 transaction
        Else arbitrate CSM1 with CSM2 & CSM3

The granted master device (M1) is permitted to proceed with a transaction while transactions involving other master devices (M2 and M3) are buffered for future communication.
Similarly:

If ((CSM2!=CSM1) && (CSM2!=CSM3))
        Allow M2 transaction
        Else arbitrate CSM2 with CSM1 & CSM3
and
    If ((CSM3!=CSM1) && (CSM3!=CSM2))
        Allow M3 transaction
        Else arbitrate CSM3 with CSM1 & CSM2

In these additional examples, the transaction initiated or requested by the granted master device is allowed and transactions initiated or requested by the other master devices are buffered for future communication.

Figure 11:
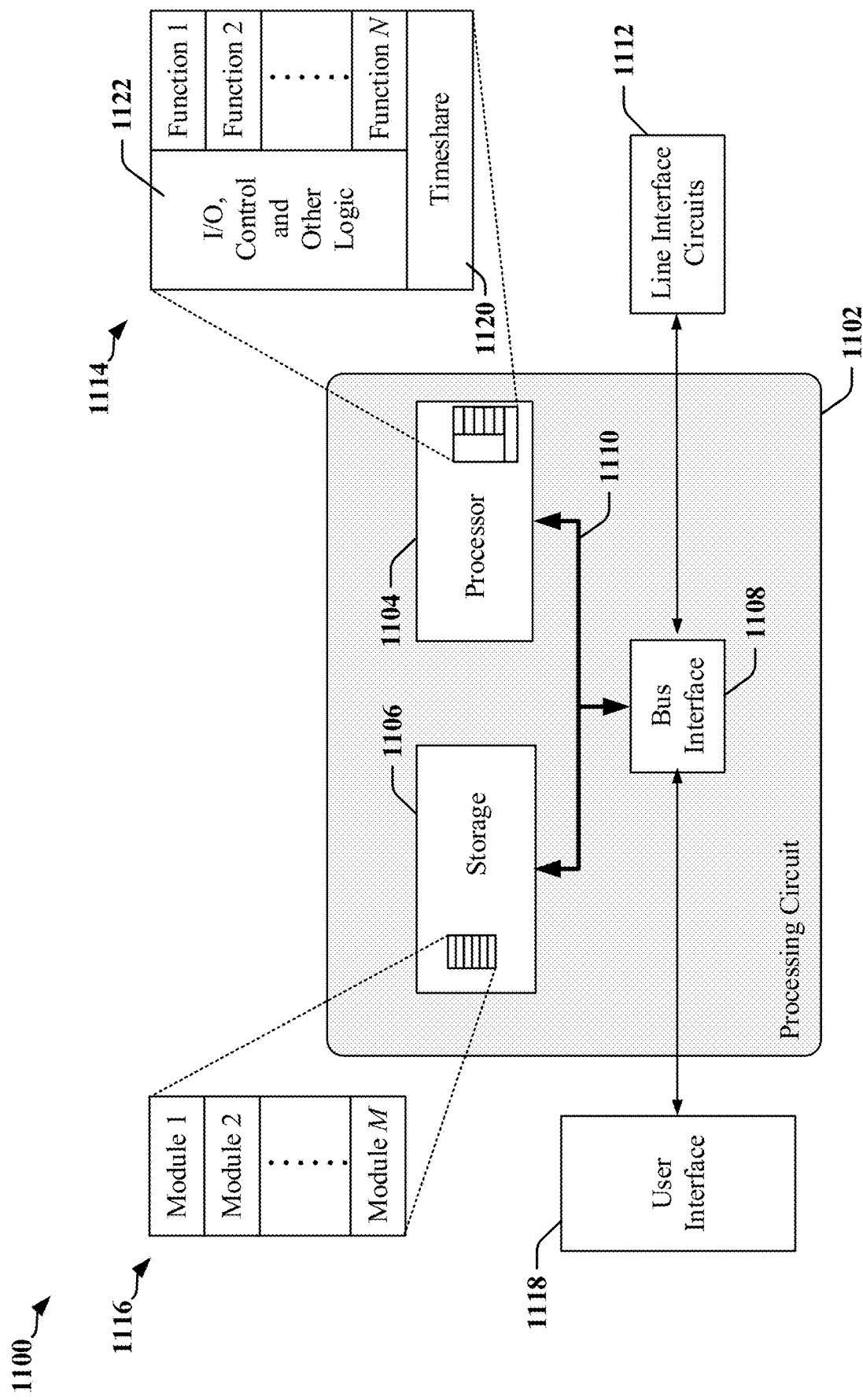
FIG. 11 illustrates one example of an apparatus employing a processing circuit that may be adapted according to certain aspects disclosed herein.

In a second example, multiple masters are trying to access different slaves, and parallel communication between the master devices and corresponding slave devices is possible. The operation of certain circuits and/or processes in the interconnect circuit 800 may be expressed as follows:

If ((CSM1!=CSM2) && (CSM1!=CSM3))
        Allow M1 transaction
    If ((CSM2!=CSM1) && (CSM2!=CSM3))
        Allow M2 transaction
    If ((CSM3!=CSM1) && (CSM3!=CSM2))
        Allow M3 transaction Examples of Processing Circuits and Methods FIG. 11 is a diagram illustrating an example of a hardware implementation for an apparatus 1100 employing an SPI bus. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112. A transceiver 1112 may be provided for each networking technology supported by the processing circuit. In some instances, multiple networking technologies may share some or all of the circuitry or processing modules found in a transceiver 1112. Each transceiver 1112 provides a means for communicating with various other apparatus over a transmission medium. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the transceiver 1112, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the transceiver 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
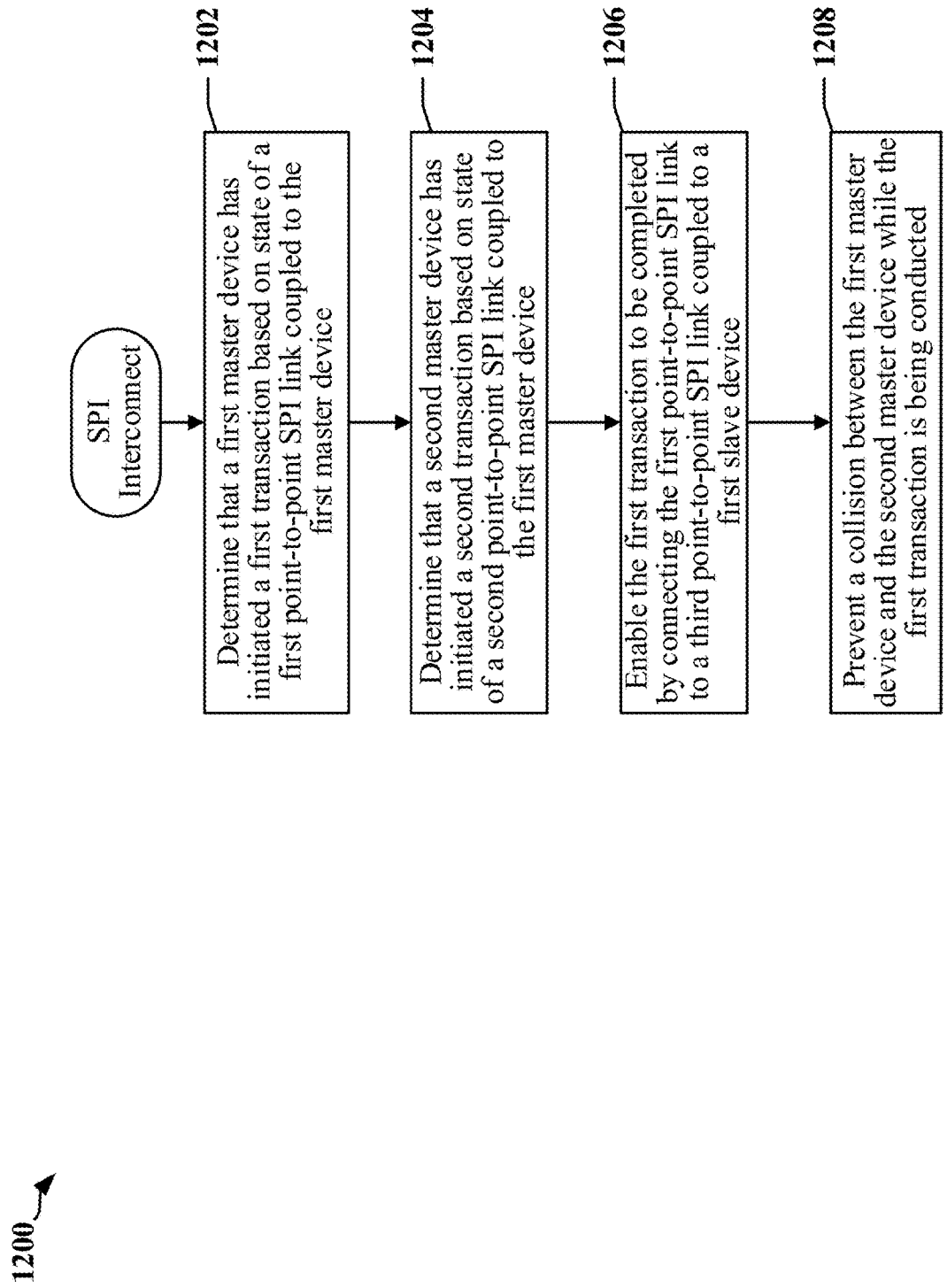
FIG. 12 is a flowchart illustrating certain operations of an application processor adapted to cause slave devices to obtain multiple dynamic addresses in accordance with certain aspects disclosed herein.

FIG. 12 is a flowchart 1200 of a method for managing a serial peripheral interface using a serial peripheral interface. In some implementations, the method is performed at least in part by a device such as the SPI interconnect circuit 520 in FIG. 5. In certain implementations, the method is performed at least in part by a device such as the interconnect circuit 800 in FIG. 8.

At block 1202, the device may determine that a first master device has initiated a first transaction based on state of a first point-to-point SPI link coupled to the first master device. At block 1204, the device may determine that a second master device has initiated a second transaction based on state of a second point-to-point SPI link coupled to the first master device. At block 1206, the device may enable the first transaction to be completed by connecting the first point-to-point SPI link to a third point-to-point SPI link coupled to a first slave device. At block 1208, the device may prevent a collision between the first master device and the second master device while the first transaction is being conducted.

A transaction may be initiated when a master device asserts a slave select signal that is coupled to a chip select input of a slave device that is to participate in the transaction. Transactions may be performed to exchange commands, control information and/or data. The transactions may be structured and sized in accordance with an SPI protocol.

In some examples, the second master device initiates the second transaction after the first transaction is completed. In these examples, a collision is avoided during the first transaction and collisions can be avoided during the second transaction when other master device refrain from initiating additional transactions.

In certain examples, the first transaction and the second transaction may be initiated concurrently and/or the second transaction may be initiated before the first transaction is completed. The timing in these examples can present a risk of collision. In one example, a first slave device is involved in the first transaction and in the second transaction. The device may store data and chip select information associated with the first slave device in a buffer until the first transaction is completed, and complete the second transaction using the data and the chip select information stored in the buffer. The device may delay the second transaction until after the first transaction is completed. In another example, the first slave device is involved in the first transaction and a second slave device is involved in the second transaction and the device may provide a first switched connection between the first point-to-point SPI link and the third point-to-point SPI link, and may provide a second switched connection between the second point-to-point SPI link and a fourth point-to-point SPI link coupled to the second slave device. The first switched connection and the second switched connection may be separate and operated independently.

In one example, the device may detect initiation of the first transaction when the first master device asserts a slave select corresponding to the first slave device, and assert a chip select of the first slave device when enabling completion of the first transaction.

In one example, the first master device, the second master device and the first slave device are operated in accordance with an SPI protocol that permits a single master coupled to an SPI bus.

Figure 13:
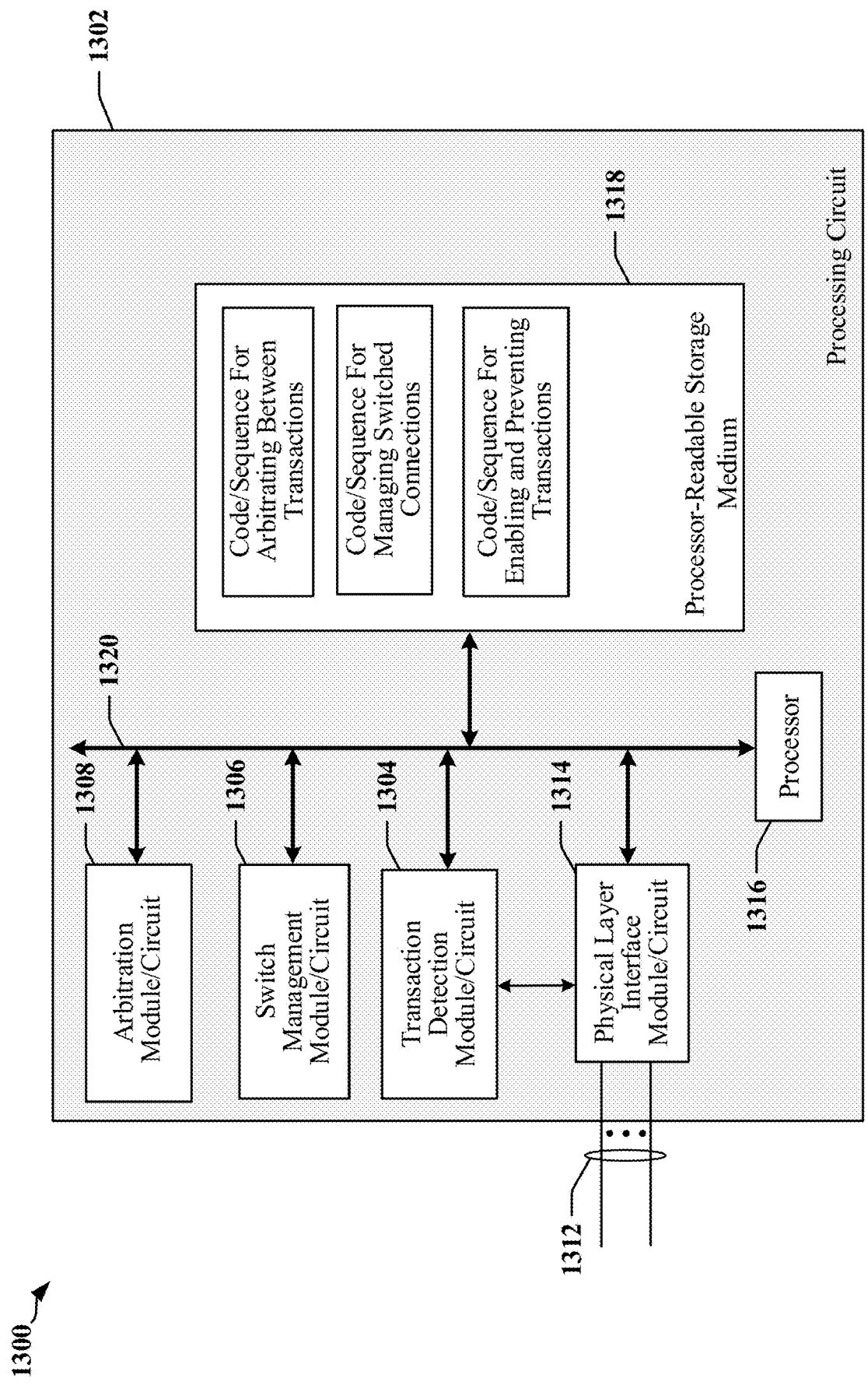
FIG. 13 illustrates a first example of a hardware implementation for an apparatus adapted to respond to multiple dynamic addresses in accordance with certain aspects disclosed herein.

FIG. 13 is a diagram illustrating a simplified example of a hardware implementation for an apparatus 1300 employing a processing circuit 1302. The apparatus may implement a bridging circuit in accordance with certain aspects disclosed herein. The processing circuit typically has a controller or processor 1316 that may include one or more microprocessors, microcontrollers, digital signal processors, sequencers and/or state machines. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the controller or processor 1316, the modules or circuits 1304, 1306 and 1308, and the processor-readable storage medium 1318. The apparatus may be coupled to a multi-wire communication link using a physical layer circuit 1314. The physical layer circuit 1314 may operate the multi-wire communication link as a serial peripheral interface bus 1312. The bus 1320 may also link various other circuits such as timing sources, peripherals, voltage regulators, and power management circuits, which are well known in the art, and therefore, will not be described any further.

The processor 1316 is responsible for general processing, including the execution of software, code and/or instructions stored on the processor-readable storage medium 1318. The computer-readable storage medium may include a non-transitory storage medium. The software, when executed by the processor 1316, causes the processing circuit 1302 to perform the various functions described supra for any particular apparatus. The computer-readable storage medium may be used for storing data that is manipulated by the processor 1316 when executing software. The processing circuit 1302 further includes at least one of the modules 1304, 1306 and 1308. The modules 1304, 1306 and 1308 may be software modules running in the processor 1316, resident/stored in the processor-readable storage medium 1318, one or more hardware modules coupled to the processor 1316, or some combination thereof. The modules 1304, 1306 and 1308 may include microcontroller instructions, state machine configuration parameters, or some combination thereof.

In one configuration, the apparatus 1300 includes modules and/or circuits 1308 configured to arbitrate between SPI transactions initiated concurrently, modules and/or circuits 1306 configured to manage a switch that selectively connects master devices with slave devices, and modules and/or circuits 1308 configured to detect initiation of transactions based on assertion of a slave select signal by an SPI master device.

In some implementations, the apparatus 1300 has an interconnect circuit coupled to each of a plurality of devices, each device including a SPI circuit that couples the interconnect circuit to each of the plurality of devices through point-to-point SPI links. The interconnect circuit may be configured to couple pairs of devices selected from the plurality of devices through their point-to-point SPI links, enable a first transaction to be completed between a first pair of devices after a first master device in the first pair of devices initiates the first transaction, enable a second transaction to be completed between a second pair of devices after a second master device in the second pair of devices initiates the second transaction, and prevent a collision between the first master device and the second master device while the first pair of devices are engaged in the first transaction. A pair of devices may be selected for coupling when it participates in a transaction.

In one example, the interconnect circuit is further configured to provide a point-to-point connection between the point-to-point SPI links of the first pair of devices, thereby enabling the first transaction to be completed. The second master device may initiate the second transaction after the first transaction is completed.

In certain examples, the first transaction and the second transaction are initiated concurrently, or the second transaction is initiated before the first transaction is completed. A first slave device may be included in the first pair of devices and in the second pair of devices. The apparatus 1300 may have a buffer that is configured to store data and chip select information associated with the first slave device until the first transaction is completed. The second transaction can be completed using the data and the chip select information stored in the buffer. The interconnect circuit may be further configured to delay the second transaction until after the first transaction is completed.

In some examples, the first pair of devices include a first slave device and the second pair of devices includes a second slave device that is different from the first slave device. The apparatus 1300 may have a switch configured to provide a first point-to-point switched connection between the point-to-point SPI links of the first pair of devices and concurrently provide a second point-to-point switched connection between the point-to-point SPI links of the second pair of devices. The first point-to-point switched connection and the second point-to-point switched connection may be separate and can be operated independently.

In one example, the interconnect circuit is further configured to detect initiation of the first transaction when the first master device asserts a slave select corresponding to a slave device in the first pair of devices, and assert a chip select of the slave device when enabling completion of the first transaction.

In one example, the first transaction is initiated when the first master device asserts a slave select corresponding to a chip select of a slave device in the first pair of devices. The second transaction may be initiated when the second master device asserts a slave select corresponding to a chip select of a slave device in the second pair of devices.

In one example, each device in the plurality of devices operates in accordance with an SPI protocol that permits a single master coupled to an SPI bus.

In some implementations, the apparatus 1300 has an interconnect circuit adapted to support SPI bus operation. The interconnect circuit may include an arbiter, one or more buffers and a switch. The arbiter may be configured to allow a first transaction selected from a plurality of transactions initiated by two or more master devices. The two or more master devices may be coupled to the interconnect circuit through corresponding point-to-point SPI links. Each of the plurality of transactions involves a slave device coupled to the interconnect circuit through a corresponding point-to-point SPI link. The one or more buffers may be configured to store chip select information and data associated with at least one transaction. The switch may be configured to provide point-to-point connections. Each point-to-point connection may couple a pair of devices that includes a master device and a slave device. The arbiter and the switch may cooperate to prevent a collision between the two or more master devices when the first transaction is being conducted.

In certain examples, the first transaction is initiated by a first master device, and a second transaction is initiated by a second master device concurrently or before the first transaction is completed. The arbiter may be further configured to delay the second transaction when the first transaction involves a slave device involved in the first transaction, and allow the second transaction after the first transaction is completed. The second transaction can be conducted using the chip select information and data associated with the second transaction stored in the one or more buffers. The arbiter may be further configured to cause chip select information and data associated with the second transaction to be stored in the one or more buffers.

In some examples, the arbiter is further configured to allow the second transaction to proceed concurrently with the first transaction when the second transaction involves a slave device uninvolved in the first transaction. The switch may be further configured to provide a first point-to-point connection coupling a first pair of devices that is associated with the first transaction, and provide a second point-to-point connection coupling a second pair of devices that is associated with the second transaction. The first transaction and second transaction can be conducted concurrently.

In some examples, the switch and arbiter are further configured to identify initiation of the first transaction when the first master device asserts a slave select corresponding to a chip select of a slave device in the first pair of devices, and identify initiation of the second transaction when the second master device asserts a slave select corresponding to a chip select of a slave device in the second pair of devices. The two or more master devices and slave device involved in each of the plurality of transactions may be operated in accordance with an SPI protocol that permits a single master coupled to an SPI bus.

In some implementations, the processor-readable storage medium 1318 includes instructions that are executed by the processor 1316 and cause the processing circuit 1302 to determine that a first master device has initiated a first transaction based on state of a first point-to-point SPI link coupled to the first master device. The instructions may cause the processing circuit 1302 to determine that a second master device has initiated a second transaction based on state of a second point-to-point SPI link coupled to the first master device. The instructions may cause the processing circuit 1302 to enable the first transaction to be completed by connecting the first point-to-point SPI link to a third point-to-point SPI link coupled to a first slave device. The instructions may cause the processing circuit 1302 to prevent a collision between the first master device and the second master device while the first transaction is being conducted.

A transaction may be initiated when a master device asserts a slave select signal that is coupled to a chip select input of a slave device that is to participate in the transaction. Transactions may be performed to exchange commands, control information and/or data. The transactions may be structured and sized in accordance with an SPI protocol.

In some examples, the second master device initiates the second transaction after the first transaction is completed. In these examples, a collision is avoided during the first transaction and collisions can be avoided during the second transaction when other master device refrain from initiating additional transactions.

In certain examples, the first transaction and the second transaction may be initiated concurrently and/or the second transaction may be initiated before the first transaction is completed. The timing in these examples can present a risk of collision. In one example, a first slave device is involved in the first transaction and in the second transaction. The instructions may cause the processing circuit 1302 to store data and chip select information associated with the first slave device in a buffer until the first transaction is completed, and complete the second transaction using the data and the chip select information stored in the buffer. The instructions may cause the processing circuit 1302 to delay the second transaction until after the first transaction is completed. In another example, the first slave device is involved in the first transaction and a second slave device is involved in the second transaction and the instructions may cause the processing circuit 1302 to provide a first switched connection between the first point-to-point SPI link and the third point-to-point SPI link, and may provide a second switched connection between the second point-to-point SPI link and a fourth point-to-point SPI link coupled to the second slave device. The first switched connection and the second switched connection may be separate and operated independently.

In one example, the instructions may cause the processing circuit 1302 to detect initiation of the first transaction when the first master device asserts a slave select corresponding to the first slave device, and assert a chip select of the first slave device when enabling completion of the first transaction.

In one example, the first master device, the second master device and the first slave device are operated in accordance with an SPI protocol that permits a single master coupled to an SPI bus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus, comprising:
   a plurality of devices, each device including a serial peripheral interface (SPI) circuit; and
   an interconnect circuit coupled to each of the plurality of devices through point-to-point SPI links, wherein the interconnect circuit is configured to:
      couple pairs of devices selected from the plurality of devices through their point-to-point SPI links, wherein the pairs of devices are selected when they are participants in one or more transactions;
      enable a first transaction to be completed between a first pair of devices after a first master device in the first pair of devices initiates the first transaction, the first pair of devices further comprising a first slave device;
      enable a second transaction to be completed between a second pair of devices after a second master device in the second pair of devices initiates the second transaction, the second pair of devices further comprising a second slave device different from the first slave device; and
      prevent a collision between the first master device and the second master device while the first pair of devices are engaged in the first transaction, wherein the first transaction and the second transaction are initiated concurrently, or the second transaction is initiated before the first transaction is completed, and
   wherein the interconnect circuit comprises a switch configured to provide a first point-to-point switched connection between the point-to-point SPI links of the first pair of devices and concurrently provide a second point-to-point switched connection between the point-to-point SPI links of the second pair of devices, wherein the first point-to-point switched connection and the second point-to-point switched connection are separate and operated independently;
   a first buffer having a breadth configured to store a chip select value for each slave device coupled to the interconnect circuit and having a depth configured to buffer a transaction for each master device coupled to the interconnect circuit; and
   a second buffer having a depth configured to store data for each transaction stored in the first buffer,
   wherein the transaction for each master device is stored in the first buffer pending arbitration by the interconnect circuit.

2. The apparatus of claim 1, wherein the interconnect circuit is further configured to:
   provide a point-to-point connection between the point-to-point SPI links of the first pair of devices, thereby enabling the first transaction to be completed.

3. The apparatus of claim 1, wherein the interconnect circuit is further configured to:
   detect initiation of the first transaction when the first master device asserts a slave select corresponding to the first slave device in the first pair of devices; and
   assert the chip select value of the first slave device when enabling completion of the first transaction.

4. The apparatus of claim 1, wherein the first transaction is initiated when the first master device asserts a slave select corresponding to the chip select value of the first slave device in the first pair of devices, and wherein the second transaction is initiated when the second master device asserts a slave select corresponding to the chip select value of the second slave device in the second pair of devices.

5. The apparatus of claim 1, wherein each device in the plurality of devices is operated in accordance with an SPI protocol that permits a single master coupled to an SPI bus.

6. An interconnect circuit configured to support serial peripheral interface (SPI) bus operations, comprising:
   an arbiter configured to allow a first transaction selected from a plurality of transactions initiated by two or more master devices, wherein the two or more master devices are coupled to the interconnect circuit through corresponding point-to-point SPI links, and wherein each of the plurality of transactions involves a slave device coupled to the interconnect circuit through a corresponding point-to-point SPI link, wherein the first transaction is initiated by a first master device, and wherein a second transaction is initiated by a second master device concurrently or before the first transaction is completed, and the arbiter further configured to allow the second transaction to proceed concurrently with the first transaction when the second transaction involves the slave device uninvolved in the first transaction;
   a first buffer having a breadth configured to store a chip select value for each slave device coupled to the interconnect circuit and having a depth configured to buffer a transaction for each master device coupled to the interconnect circuit;
   a second buffer having a depth configured to store data for each transaction stored in the first buffer; and
   a switch configured to provide point-to-point connections, each point-to-point connection coupling a pair of devices that includes one master device and one slave device, wherein the arbiter and the switch cooperate to prevent a collision between the two or more master devices when the first transaction is being conducted,
   wherein a transaction for at least one master device is stored in the first buffer when a potential conflict is detected.

7. The interconnect circuit of claim 6, wherein the switch is further configured to:
   provide a first point-to-point connection coupling a first pair of devices that is associated with the first transaction; and
   provide a second point-to-point connection coupling a second pair of devices that is associated with the second transaction, wherein the first transaction and the second transaction are conducted concurrently.

8. The interconnect circuit of claim 6, wherein the switch and the arbiter are further configured to:
   identify initiation of the first transaction when the first master device asserts a slave select corresponding to the chip select value of the slave device involved in the first transaction; and identify initiation of the second transaction when the second master device asserts a slave select corresponding to the chip select value of the slave device involved in the second transaction.

9. The interconnect circuit of claim 6, wherein the two or more master devices and the slave device involved in each of the plurality of transactions operate in accordance with an SPI protocol that permits a single master coupled to an SPI bus.

10. A method for managing a serial peripheral interface, comprising:
determining that a first master device has initiated a first transaction based on state of a first point-to-point serial peripheral interface (SPI) link coupled to the first master device;
determining that a second master device has initiated a second transaction based on state of a second point-to-point SPI link coupled to the second master device;
enabling the first transaction to be completed by connecting the first point-to-point SPI link to a third point-to-point SPI link coupled to a first slave device;
enabling the second transaction to be completed by connecting the second point-to-point SPI link to a fourth point-to-point SPI link coupled to a second slave device different from the first slave device, wherein the first transaction and the second transaction are initiated concurrently, or the second transaction is initiated before the first transaction is completed;
providing a first switched connection between the first point-to-point SPI link and the third point-to-point SPI link by a switch;
providing a second switched connection between the second point-to-point SPI link and the fourth point-to-point SPI link by the switch, wherein the first switched connection and the second switched connection are separate and operated independently;
preventing a collision between the first master device and the second master device while the first transaction is being conducted;
storing a chip select value for each slave device in a first buffer having a depth configured to buffer a transaction for each master device; and
storing data for each transaction stored in the first buffer in a second buffer, wherein preventing the collision includes buffering the transactions in the first buffer for at least one master device when a potential collision is detected.

11. The method of claim 10, further comprising:
detecting initiation of the first transaction when the first master device asserts a slave select corresponding to the first slave device; and
asserting the chip select value of the first slave device when enabling completion of the first transaction.

12. The method of claim 10, wherein the first master device, the second master device, the first slave device, and the second slave device are operated in accordance with an SPI protocol that permits a single master coupled to an SPI bus.

13. The apparatus of claim 1, wherein the transaction for at least one master device is stored in the first buffer when a potential conflict is detected.

14. The interconnect circuit of claim 6, wherein a transaction for each master device is stored in the first buffer pending arbitration by the interconnect circuit.

* * * * *